US008332525B2

(12) United States Patent
Lynch et al.

(10) Patent No.: US 8,332,525 B2
(45) Date of Patent: Dec. 11, 2012

(54) DYNAMIC SERVICE GROUPS BASED ON SESSION ATTRIBUTES

(75) Inventors: Timothy J. Lynch, San Francisco, CA (US); Srikanth Chavali, Fremont, CA (US); Francois Lemarchand, Palaiseau (FR); Sudhakar Chunduru, Dublin, CA (US); Sunny Wang, Saratoga, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 402 days.

(21) Appl. No.: 12/701,418

(22) Filed: Feb. 5, 2010

(65) Prior Publication Data

US 2011/0196977 A1 Aug. 11, 2011

(51) Int. Cl.
*G06F 15/16* (2006.01)
(52) U.S. Cl. .............. 709/229; 726/15; 379/201.01
(58) Field of Classification Search .............. 709/229
See application file for complete search history.

(56) References Cited

U.S. PATENT DOCUMENTS

| 6,856,676 B1 * | 2/2005 | Pirot et al. ............ 379/201.01 |
| 2008/0022392 A1 * | 1/2008 | Karpati et al. ............ 726/15 |

FOREIGN PATENT DOCUMENTS

| GB | 2 403 622 A | 1/2005 |
| WO | WO 01/31964 A1 | 5/2001 |

* cited by examiner

*Primary Examiner* — Yves Dalencourt
(74) *Attorney, Agent, or Firm* — Blakely Sokoloff Taylor & Zafman, LLP

(57) ABSTRACT

Service groups are dynamically created and members are dynamically assigned. A network element receives a request for a subscriber session and transmits an authentication request to a AAA server. The network element receives an authentication reply from the AAA server that includes dynamic service group configuration information that indicates that the subscriber session should be part of a service group and defines the criteria for the network element to dynamically create and join that subscriber session to a service group if an appropriate service group does not exist or dynamically join that subscriber session to an existing service group. The network element derives a dynamic service group identifier from attributes of the subscriber session based on instructions in the dynamic service group configuration information. Based on that dynamic service group identifier and service group attribute information in the configuration information, the network element dynamically creates and joins the subscriber session to a service group if an appropriate service group does not exist or dynamically joins the subscriber session to an existing appropriate service group.

20 Claims, 7 Drawing Sheets

DYNAMIC SERVICE GROUPS BASED ON SESSION ATTRIBUTES

BACKGROUND

1. Field

Embodiments of the invention relate to the field of networking; and more specifically to the creation of dynamic service groups based on session attributes.

2. Background

A network element (e.g., a router, switch, bridge, etc.) is a piece of networking equipment, including hardware and software, that communicatively interconnects other equipment on the network (e.g., other network elements, end stations, etc.). Some network elements are "multiple services network elements" that provide support for multiple networking functions (e.g., routing, bridging, switching, Layer 2 aggregation, and/or subscriber management), and/or provide support for multiple application services (e.g., data, voice, and video). Subscriber end stations (e.g., servers, workstations, laptops, palm tops, mobile phones, smartphones, multimedia phones, voice over internet protocol (VOIP) phones, portable media players, GPS units, gaming systems, set-top boxes, etc.) access content/services provided over the Internet and/or content/services provided on virtual private networks (VPNs) overlaid on the Internet, intranets and/or other private networks. The content and/or services are typically provided by one or more end stations (e.g., server end stations belonging to a service or content provider, or end stations participating in a peer to peer service) and may include public webpages (free content, store fronts, search services, etc.), private webpages (e.g., username/password accessed webpages providing email services, etc.), corporate networks over VPNs, etc. Typically, subscriber end stations are coupled (e.g., through customer premise equipment coupled to an access network (wired or wirelessly)) to edge network elements, which are coupled (e.g., through one or more core network elements to other edge network elements) to the other end stations (e.g., server end stations).

Certain network elements (e.g., certain edge network elements) allow for manually creating a service group and manually determining its members (e.g., subscriber sessions). As used herein, a service group is a virtual construct that allows various sets of circuits (e.g., subscriber sessions, VLANs (Virtual Local Area Networks), ATM PVCs (Asynchronous Transfer Mode Permanent Virtual Circuits), etc.) to be grouped together for configuration purposes (e.g., collective rate enforcement, metering, policing, scheduling, common Access Control List configuration, etc.) and for a commonly maintained state (e.g., enforcing rate control or a stateful firewall where the actions/behavior of one session impacts enforcement for all members of the service group). A circuit is an internal construct in a network element that represents a distinguishable flow of packets being communicated forwarded by the network element using a protocol and may be identified by factors such as the physical interface and a unique combination of protocol encapsulations, addresses, VLAN, and session identifiers marked in those packet's headers.

Service groups can be manually created using a CLI or other provisioning interface of the network element. After the service group has been created, the members of the service group (e.g., the subscriber sessions) are also manually configured (e.g., by provisioning an attribute (e.g., a RADIUS or local attribute) that references the same service group name). Thus, provisioning service groups typically involved two manual steps: creation of the service group itself; and adding members to that service group. Manually configuring service groups and their membership can be tedious, time consuming, and subject to error.

SUMMARY

Methods and apparatuses for dynamically configuring a parent circuit through a subscriber circuit's subscriber record on an authentication, authorization, and accounting (AAA) server responsive to an authorization event for the subscriber session on the network element are described. According to one embodiment of the invention, a network element receives a request for a subscriber session from a subscriber end station of a subscriber. The network element transmits an authentication request to the AAA server for the subscriber session, and receives an authentication reply from the AAA server that includes dynamic service group configuration information that indicates that the subscriber session should be part of a service group and includes service group attribute information and instructions to derive a dynamic service group identifier. The network element derives a dynamic service group identifier from subscriber session attributes associated with the subscriber session according to the instructions in the dynamic service group configuration information. The network element determines whether there is a service group that matches the service group attribute information and the dynamic service group identifier. If there is such a service group, the network element dynamically joins the subscriber session to that service group. If there is not such a service group, the network element creates a service group according to the service group attribute information and the dynamic service group identifier and joins the subscriber session to the created group. As a result, manual creation of a service group and manual joining of the subscriber session to that service group are avoided.

In another embodiment of the invention, a network element, to be coupled to an AAA server, includes multiple control modules that are operative to dynamically create service groups based on subscriber session attributes of subscriber sessions and dynamic service group configuration information. Each dynamically created service group is associated with one or more service group attributes. The control modules are also operative to dynamically join subscriber sessions to service groups based on subscriber session attributes of the subscriber sessions and dynamic service group configuration information associated with the subscriber sessions such that the service group attributes associated with the service group are applied to the subscriber sessions. As a result, service groups are dynamically created and subscriber sessions are dynamically joined to service groups thereby avoiding manual creation of service groups and manual joining of subscriber sessions to service groups.

In another embodiment of the invention, a AAA server that stores multiple subscriber records that each include dynamic service group configuration information is coupled to one or more network elements. Each network element includes multiple control modules that receives, for each subscriber session being established with that network element, dynamic service group configuration information associated with that subscriber session from the AAA server. The dynamic service group configuration information includes criteria for determining whether to create and join that subscriber session to a service group or join the subscriber session to an existing service group. The control modules derives, for each of those subscriber sessions, a dynamic service group identifier from instructions in the corresponding dynamic service group configuration information. The control modules dynamically creates and joins each of those subscriber sessions to a service group based on its dynamic service group identifier and the dynamic service group configuration information if a matching service group does not exist. The created service group is associated with one or more service group attributes. The control modules dynamically joins each of those subscriber subscribers to an existing service group based on its dynamic service group identifier and the dynamic service group configuration information if a matching service group already exists such that the service group attributes are applied to that subscriber session. As a result, service groups are dynamically created and subscriber sessions are dynamically joined to service groups thereby avoiding manual creation of service groups and manual joining of subscriber sessions to service groups.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
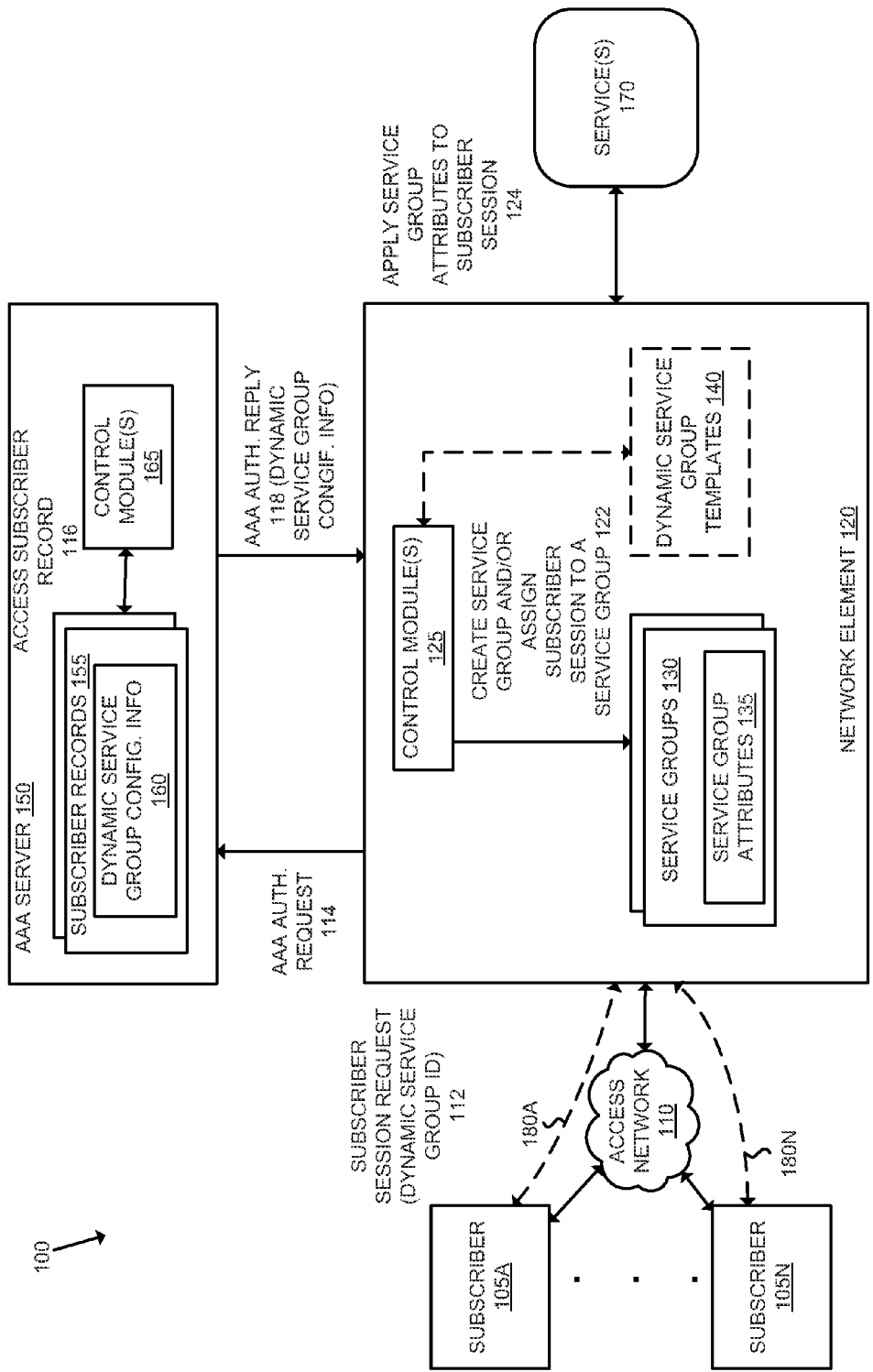
FIG. 1 illustrates an exemplary network where service groups are dynamically created and members are dynamically assigned according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Some network elements include functionality for AAA (authentication, authorization, and accounting) protocols (e.g., RADIUS (Remote Authentication Dial-In User Service), Diameter, and/or TACACS+(Terminal Access Controller Access Control System)). AAA can be provided through a client/server model, where the AAA client is implemented on a network element and the AAA server can be implemented either locally on the network element or on a remote end station (e.g., server end station) coupled with the network element. Authentication is the process of identifying and verifying a subscriber. For instance, a subscriber might be identified by a combination of a username and a password or through a unique key. Authorization determines what a subscriber can do after being authenticated, such as gaining access to certain end station information resources (e.g., through the use of access control policies). Accounting is recording user activity. By way of a summary example, subscriber end stations may be coupled (e.g., through an access network) through an edge network element (supporting AAA processing) coupled to core network elements coupled to server end stations of service/content providers. AAA processing is performed to identify the subscriber record for a subscriber. A subscriber record includes a set of attributes (e.g., subscriber name, password, authentication information, access control information, rate-limiting information, policing information, etc.) used during processing of that subscriber's traffic.

Certain network elements (e.g., certain edge network elements) internally represent subscriber end stations (or sometimes customer premise equipment (CPE) such as a residential gateway (e.g., a router, modem)) using subscriber circuits. A subscriber circuit uniquely identifies within the network element a subscriber session and typically exists for the lifetime of the session. Thus, a network element typically allocates a subscriber circuit when the subscriber connects to that network element, and correspondingly de-allocates that subscriber circuit when that subscriber disconnects. Each subscriber session represents a distinguishable flow of packets communicated between the network element and a subscriber end station (or sometimes CPE such as a residential gateway or modem) using a protocol, such as the point-to-point protocol over another protocol (PPPoX) (e.g., where X is Ethernet or Asynchronous Transfer Mode (ATM)), Ethernet, 802.1Q Virtual LAN (VLAN), Internet Protocol, ATM, etc. A subscriber session can be initiated using a variety of mechanisms: manual provisioning a dynamic host configuration protocol (DHCP), DHCP/client-less internet protocol service (CLIPS), Media Access Control (MAC) address tracking, etc. For example, the point-to-point protocol (PPP) is commonly used for DSL services and requires installation of a PPP client that enables the subscriber to enter a username and a password, which in turn may be used to select a subscriber record. When DHCP is used (e.g., for cable modem services), a username typically is not provided; but in such situations the MAC address of the hardware in the subscriber end station (or CPE) is provided. The use of DHCP and CLIPS on the network element captures the MAC addresses and uses these addresses to distinguish subscribers and access their subscriber records.

A method and apparatus for dynamically creating service groups a network element through use of an authentication, authorization, and accounting (AAA) server is described. In one embodiment, service groups are dynamically created and subscriber sessions are dynamically joined to service groups based on attributes of those subscriber sessions. For example, subscriber session attributes can be determined when a subscriber end station connects to the network element to initiate a subscriber session. The network element transmits an authentication request to a AAA server to authenticate the subscriber session. The AAA server accesses the appropriate subscriber record and transmits an authentication reply to the network element. If dynamic service group functionality is configured for the subscriber session (e.g., as indicated in the subscriber record), the authentication reply will include dynamic service group configuration information. The dynamic service group configuration information indicates to the network element that the subscriber session should be part of a service group and identifies the criteria for dynamically creating a service group and/or dynamically assigning the subscriber session to a service group. For example, the dynamic service group configuration information includes instructions to derive a dynamic service group identifier from the session attributes (e.g., the instructions identify which value(s) of the session attributes should be used as the dynamic service group identifier). The dynamic service group configuration information also includes a service group attribute template identifier that is used by the network element as a reference to a set of one or more service group attributes that have been previously defined (e.g., in a manually created service group). The network element creates and joins the subscriber session to service group if a service group matching the dynamic service group identifier and the service group attribute template identifier does not exist; if a matching service group exists, the network element joins the subscriber session to that service group such that the attributes of that service group are applied to the subscriber session and the session shares common state for purposes such as rate enforcement, metering, policing, scheduling, common Access Control List configuration with other members of the service group. The service group may also serve as a point of OAM (Operations, Administration, and Management) for its members (e.g., collective statistics such as the total number of packets received and transmitted on all member circuits, etc.).

The dynamic service group identifiers may be unique to a single subscriber or may be common across multiple subscribers. In addition, the dynamic service group identifier may be different for different protocols (e.g., DHCP (Dynamic Host Configuration Protocol), PPPoX (Point to Point over Ethernet/ATM, etc.), static subscribers, etc.). For example, in a DHCP access network, the dynamic service group identifier can be an agent-circuit-id or an agent-remote-id located in DCHP Option 82 of DHCP packets. As another example, in a DHCP access network, the dynamic service group identifier can be a subset of the agent-circuit-id or agent-remote-id. For example, in a four-byte agent-circuit-id, the upper two bytes can indicate a commonly shared segment of the access network that may be appropriate to be members of the service group. Of course it should be understood the dynamic service group identifier can also be information that uniquely identifies that subscriber (e.g., username/password, MAC address, etc.), a subscriber's domain, an IP subnet, an encapsulating VLAN identifier (inner VLAN identifier), their line identifiers, a service identifier, or any combination of the same.

FIG. 1 illustrates an exemplary network where service groups are dynamically created and members are dynamically assigned according to one embodiment of the invention. The network 100 includes a number of subscribers 105A-105N that are coupled to one or more services 170 through the access network 110 and the network element 120. Each of the subscribers 105A-105N may include one or more subscriber end stations (e.g., workstations, laptops, palm tops, mobile phones, smartphones, multimedia phones, tablets, Voice Over Internet Protocol (VoIP) phones, portable media players, GPS units, gaming systems, set-top boxes, etc.). The one or more services 170 may be provided by one or more end stations (e.g., server end stations) belonging to one or more Internet Service Providers (ISPs), one or more content providers, and/or one or more end stations participating in a peer-to-peer service providing one or more different services or content (e.g., Internet access, television services, voice services, particular content, etc.). Each of these services can be represented by a number of different attributes, including type of media, amount of bandwidth, filters, type of usage, etc. The access network 100 may include one or more access network elements. For example, in a DSL (Digital Subscriber Line) environment, the access network 100 can include one or more DSLAMs (Digital Subscriber Line Access Multiplexer), customer premise equipment, etc. Of course it should be understood that the access network 100 is not limited to DSL environment (e.g., in a cable environment, the access network 100 can include one or more CMTS (Cable Modem Termination System), etc.). It should be understood that there is typically one or more other network elements coupling the network element 120 with the service(s) 170 (e.g., one or more core network elements, etc.); however they are not illustrated in order not to confuse understanding of the invention.

The network element 120 includes the service groups 130 each of which is associated with a set of one or more service group attributes 135. Some of the service groups 130 are dynamically created, which will be described in greater detail later herein, while others may be statically (manually) created. The network element 120 is also coupled with the AAA (authentication, authorization, and accounting) server 150 and communicates with the AAA server 150 using a AAA protocol (e.g., RADIUS (Remote Authentication Dial-In User Service), Diameter, and/or TACAS+ (Terminal Access Controller Access Control System)).

The subscribers 105A-105N connect to the network element 120 through the subscriber connections 180A-180N. Each subscriber connection may include one or more subscriber sessions and can be via different protocols. For example, if the subscriber 105A is a triple play subscriber (e.g., Internet, voice, television), that subscriber may have three subscriber sessions. A subscriber session represents a distinguishable flow of packets that is received from and sent to a particular subscriber end station. The network element 120 may internally represent each subscriber session with a subscriber circuit that typically exists for the lifetime of the session. Thus the network element 120 may allocate a subscriber circuit when the subscriber connects to the network element for a particular service (and is determined to be authorized for that service) and correspondingly de-allocates that subscriber circuit when that subscriber disconnects.

As illustrated in FIG. 1, the subscribers 105A-105N initially connect to the network element 120 through the subscriber session request operation 112. These requests pass through the access network 110 to the network element 120. The network element 120 determines subscriber session attributes of the subscriber session request (which may be different for different access protocols). As will be described in greater detail later herein, a dynamic service group identifier will be derived from the subscriber session attributes, and may be unique to a single subscriber session, shared among multiple subscriber sessions of a single subscriber, or shared among multiple subscriber sessions of multiple subscribers. For example, in a DHCP/DSL environment, the dynamic service group identifier may be the agent-circuit-id associated with an incoming port of a DSLAM from which the request was sent, the agent-remote-id associated with an outgoing port of a DSLAM, or other identifier that identifies the subscriber, line identifier, or service identifier. As will be described in greater detail later herein, the dynamic service group identifier will be used by the network element 120 when dynamically creating service groups and/or dynamically assigning members to the created service groups. It should be understood that the subscriber session requests may also include other identifiers and/or information (e.g., username and password, MAC address, unique key, etc.) that may be used during AAA processing.

Sometime after receiving a subscriber session request, the network element 120 transmits an authentication request for the subscriber session (e.g., based on an identifier associated with that request (e.g., username and/or password, MAC address, unique key, etc.)) to the AAA server 150 in operation 114. For example, the control module(s) 125, which may include AAA client logic, may transmit an authentication/access-request message according to RFC 2138 to authenticate the subscriber session. In one embodiment, the authentication request includes an explicit dynamic service group configuration information request (e.g., in a VSA (Vendor-Specific Attribute)).

The AAA server 150 includes the subscriber records 155. Each of the subscriber records 155 includes a set of attributes which may include dynamic service group configuration information 160 and other attributes (subscriber name, password, authentication information, access control information, rate-limiting information, policing information, etc.) used during processing of that subscriber's traffic. The dynamic service group configuration information 160 will be used by the network element 120 when dynamically creating service groups and/or dynamically assigning membership to a service group. For example, the dynamic service group configuration information 160 indicates that the corresponding subscriber session should be part of a service group and includes criteria for the network element 120 to determine whether to dynamically create a service group and join that subscriber session or whether to join the subscriber session to an existing service group. In one embodiment, the dynamic service group configuration information 160 includes a service group attribute template identifier used by the network element as a reference to a set of one or more service group attributes that have previously been defined, and instructions on how to derive the dynamic service group configuration information from the subscriber session attributes (e.g., the value(s) of the subscriber session attributes that should be used as the dynamic service group identifier (e.g., agent-circuit-id, agent-remote-id, or other identifier)). In another embodiment, instead of a service group attribute template identifier, the dynamic service group configuration information 160 includes a set of one or more service group attributes to be applied to a dynamically created service group, as well as the instructions to derive the dynamic service group identifier. In another embodiment, some service group attributes are included in the dynamic service group configuration information while other service group attributes are referenced from a service group attribute template.

Figure 3A:
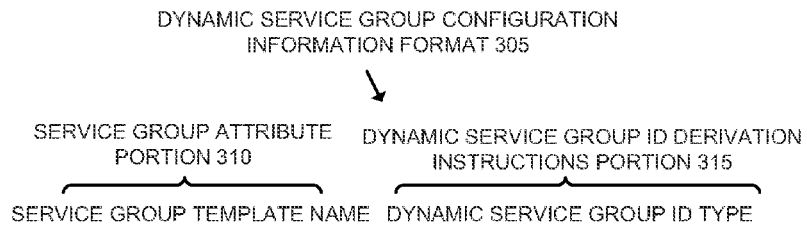
FIGS. 3A-3B illustrate an exemplary dynamic service group configuration information format according to one embodiment of the invention.
Figure 3B:
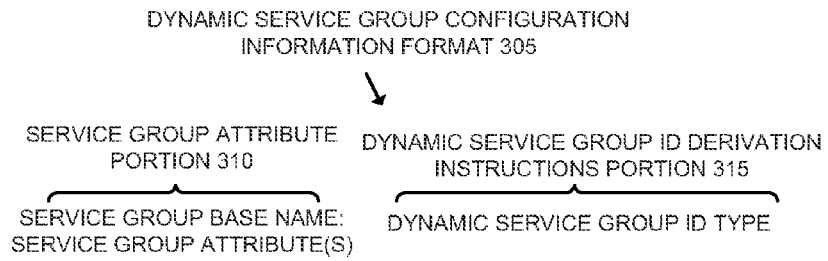

FIGS. 3A-3B illustrate an exemplary dynamic service group configuration information format 305 for the dynamic service group configuration information 160 according to one embodiment of the invention. The dynamic service group format 305 includes a service group attribute portion 310 and a dynamic service group identifier derivation instructions portion 315. As illustrated in FIG. 3A, the service group attribute portion 310 includes a service group attribute template name, which is a reference to a service group template on the network element (e.g., Gold, Silver, Bronze, etc.). As illustrated in FIG. 3B, the service group attribute portion 310 includes a service group base name and one or more service group attributes. Thus the service group attribute(s) may be referenced or included in the dynamic service group configuration information 160. The dynamic service group identification derivation instructions portion 315 as illustrated in FIGS. 3A-3B includes a dynamic service group identifier type (e.g., agent-circuit-id, agent-remote-id, or other identifier type (e.g., username/password, MAC address, subscriber's domain, an IP subnet, an encapsulating VLAN identifier (inner VLAN identifier), subscriber's line identifier, a service identifier) or any combination of the same).

Sometime after receiving the authentication request, the AAA server 150 accesses the appropriate subscriber record corresponding to the request at operation 116. For example, the control module(s) 165 accesses the appropriate one of the subscriber records 155. The appropriate subscriber record may be accessed based on subscriber specific identifiers (e.g., username and/or password, MAC address, unique key, etc.) included in the authentication request described in operation 114.

Sometime after accessing the appropriate subscriber record, the AAA server 150 transmits an authorization reply with the data from, that subscriber record as illustrated in operation 118. It should be understood that if the subscriber record includes dynamic service group configuration information, it will be included in the authorization reply. In one embodiment, the dynamic service group configuration information 160 is only returned if the subscriber has been successfully authenticated and authorized for the requested subscriber session. In one embodiment, the control module(s) 165 form an authentication/access-accept message with a VSA including the dynamic service group configuration information according to RFC 2138 that is transmitted to the network element 120.

Based on the dynamic service group configuration information 160, the network element 120 derives a dynamic service group identifier from the subscriber session attributes. For example, the dynamic service group configuration information 160 may indicate that the dynamic service group identifier should be the agent-circuit-id, agent-remote-id, or other identifier derived from the session attributes. Using the dynamic service group identifier and the attribute information from the dynamic service group configuration information 160 (the service group attribute template identifier or the service group attribute(s) depending on the embodiment), the network element 120 dynamically creates a service group 130 and/or assigns the subscriber session to a service group 130 as illustrated in operation 122.

The network element 120 will dynamically create a service group according to the dynamic service group configuration information and the dynamic service group identifier if an equivalent service group does not already exist. For example, consider a subscriber session having a subscriber record that includes dynamic service group configuration information (in the exemplary format illustrated in FIG. 3A) of "Gold agent-circuit-id," and is associated with an agent-circuit-id of 1025. In one embodiment, the service group name will be a concatenation of the service group attribute template identifier and the dynamic service group identifier. In this example, the service group name will be "Gold-agent-circuit-1025." If an equivalent service group exists (i.e., a service group with that name), then that subscriber session will join that group, otherwise a service group will be dynamically created with that service group name and the subscriber session will then join that group. It should be understood that there are other ways to name the service group taking into account the dynamic service group identifier and the attributes for that group. It should be understood that existing ones of the service groups 130 can include previously dynamically created service groups or manually created service groups (e.g., through a CLI or GUI of the network element 120).

A set of one or more service group attributes 135 are associated with dynamically created service groups and thus will be applied to subscriber sessions. Thus at operation 124, the control module(s) 125 apply a set of one or more service group attributes to the subscriber session thereby joining the subscriber session to that service group. In some embodiments the subscriber records 155 include the set of service group attributes that are returned to the network element 120, while in other embodiments the set of service group attributes are managed by the network element 120 (e.g., based on a dynamic service group template). For example, the network element 120 optionally includes the dynamic service group templates 140 which can be used to assign a set of service group attributes 135 to a service group 130. For example, with reference to FIG. 3A, in some embodiments there is a dynamic service group template 140 for each unique service group attribute template identifier portion 310 of the dynamic service group configuration information format 305. In some embodiments, the dynamic service group templates 140 are service groups that were manually created. In some embodiments, service groups are deleted and their resources freed after their last subscriber session member has terminated.

Dynamically creating a service group and dynamically joining members to the service group avoids the manual creation and manual joining which were previously necessary. For example, creating a service group dynamically whose membership is determined via an existing session attribute avoids a network administrator from configuring an identifying attribute for that session on the network element. This reduces the chance of human error, and saves time and money in provisioning costs.

Figure 4:
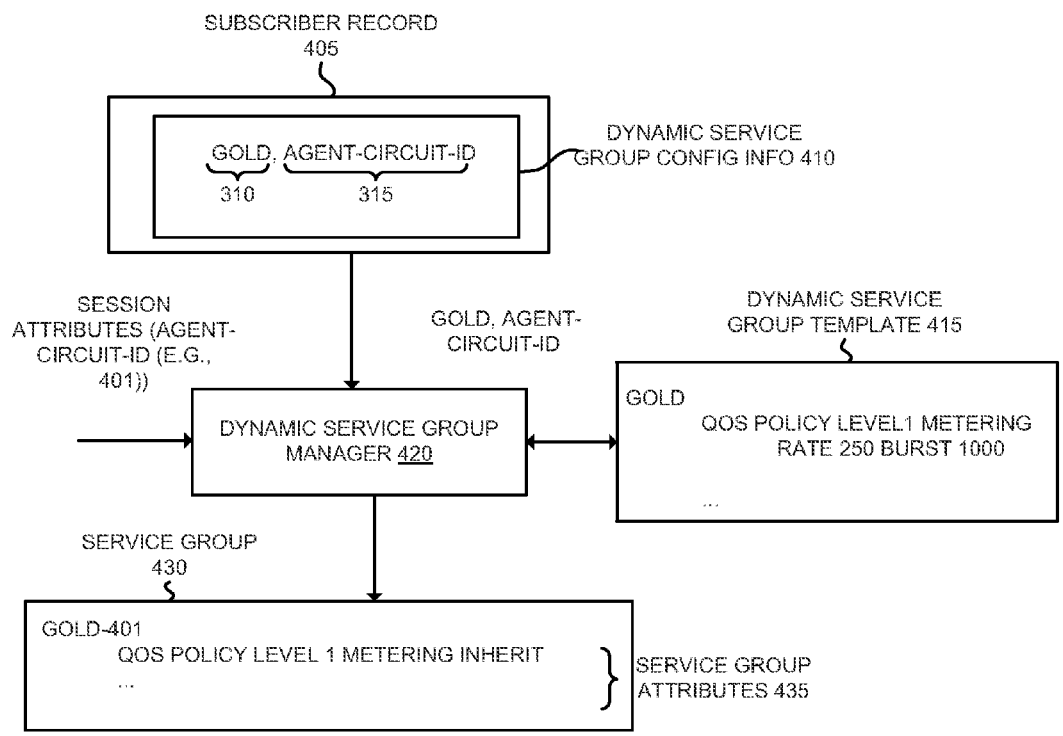
FIG. 4 illustrates an exemplary dynamic service group provisioning mechanism using a dynamic service group template according to one embodiment of the invention.

FIG. 4 illustrates an exemplary dynamic service group provisioning mechanism using a dynamic service group template according to one embodiment of the invention. The subscriber record 405, which may be located on the AAA server 150, includes the dynamic group configuration information 410. The subscriber record 405 uses the exemplary format illustrated in FIG. 3A and does not include a set of one or more service group attributes. The dynamic service group manager 420, which may be one of the control module(s) 125, receives and uses the dynamic service group configuration information 410 to derive a dynamic service group identifier from the subscriber session attributes. In this example, the dynamic service group configuration information 410 indicates that the agent-circuit-id should be used as the dynamic service group identifier. Therefore, the dynamic service group manager 420 uses the agent-circuit-id of the subscriber session, which is 401 in this example, as the dynamic service group identifier. The service group attribute template identifier in the dynamic service group configuration information 410 is "Gold" in this example. The dynamic service group manager 420 dynamically creates the service group 430 based on these parameters if an equivalent service group does not already exist and joins the subscriber session to that group; or if the service group 430 exists, dynamically joins that subscriber session to that group. The service group attributes 435 of the service group 430 are based on the dynamic service group template 415. For example, the dynamic service group template 415 defines the attributes for the Gold service (referenced by the service group template identifier in the configuration information 410) (e.g., QoS policy level1 metering (rate 250 and burst of 1000)), which are applied to the service group 430.

Figure 5:
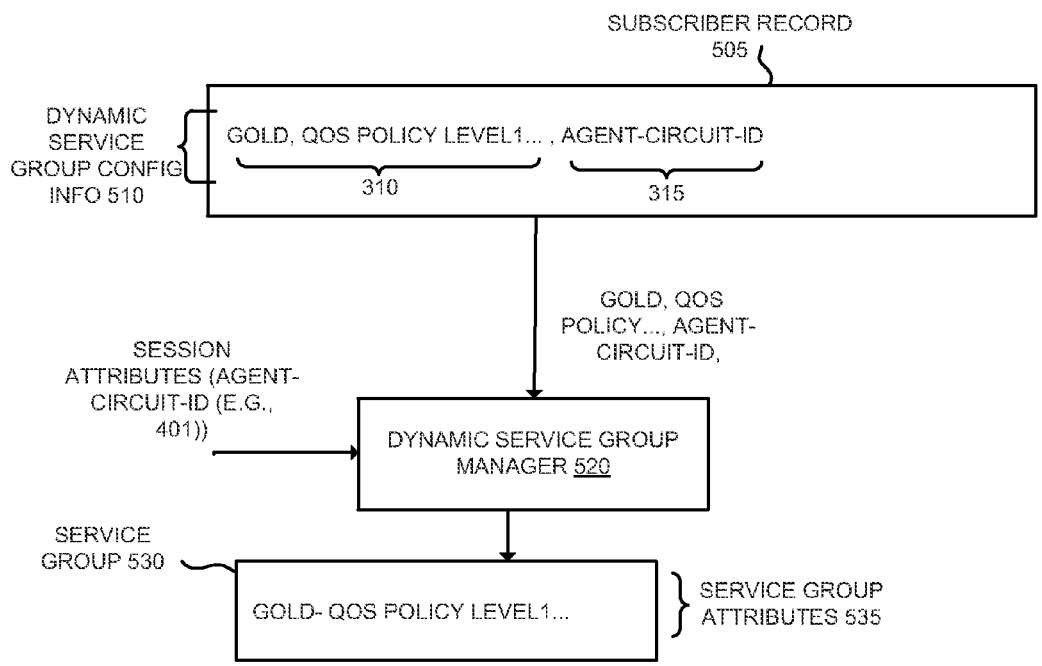
FIG. 5 illustrates an alternative dynamic service group provisioning mechanism according to one embodiment of the invention.

FIG. 5 illustrates an exemplary dynamic service group provisioning mechanism where the subscriber record contains the set of service group attributes according to one embodiment of the invention. The subscriber record 505, which may be located on the AAA server 150, uses the exemplary format illustrated in FIG. 3B and includes the dynamic service configuration information 510 which includes a set of service group attributes. The dynamic service group manager 520, which may be one of the control module(s) 125, receives and uses the dynamic service group configuration information 510 to derive a dynamic service group identifier from the subscriber session attributes. In this example, the dynamic service group configuration information 510 indicates that the agent-circuit-id should be used as the dynamic service group identifier. Therefore, the dynamic service group manager 520 uses the agent-circuit-id of the subscriber session, which is 501 in this example, as the dynamic service group identifier. The dynamic service group configuration information 510 also includes the service group attributes (e.g., in the service group attribute portion 310). The dynamic service group manager 520 dynamically creates the service group 530 based on the dynamic service group identifier and the service group attributes if an equivalent service group does not already exist and joins the subscriber session to that group. For example, an equivalent service group would be associated with the same service group base name portion and service group attributes and would be specific to the same agent-circuit-id value. If an equivalent service group exists, the dynamic service group manager 520 dynamically joins that subscriber session to that group. The service group attributes 535 of the service group 530 are the same as the service group attributes in the subscriber record 505.

Figure 2:
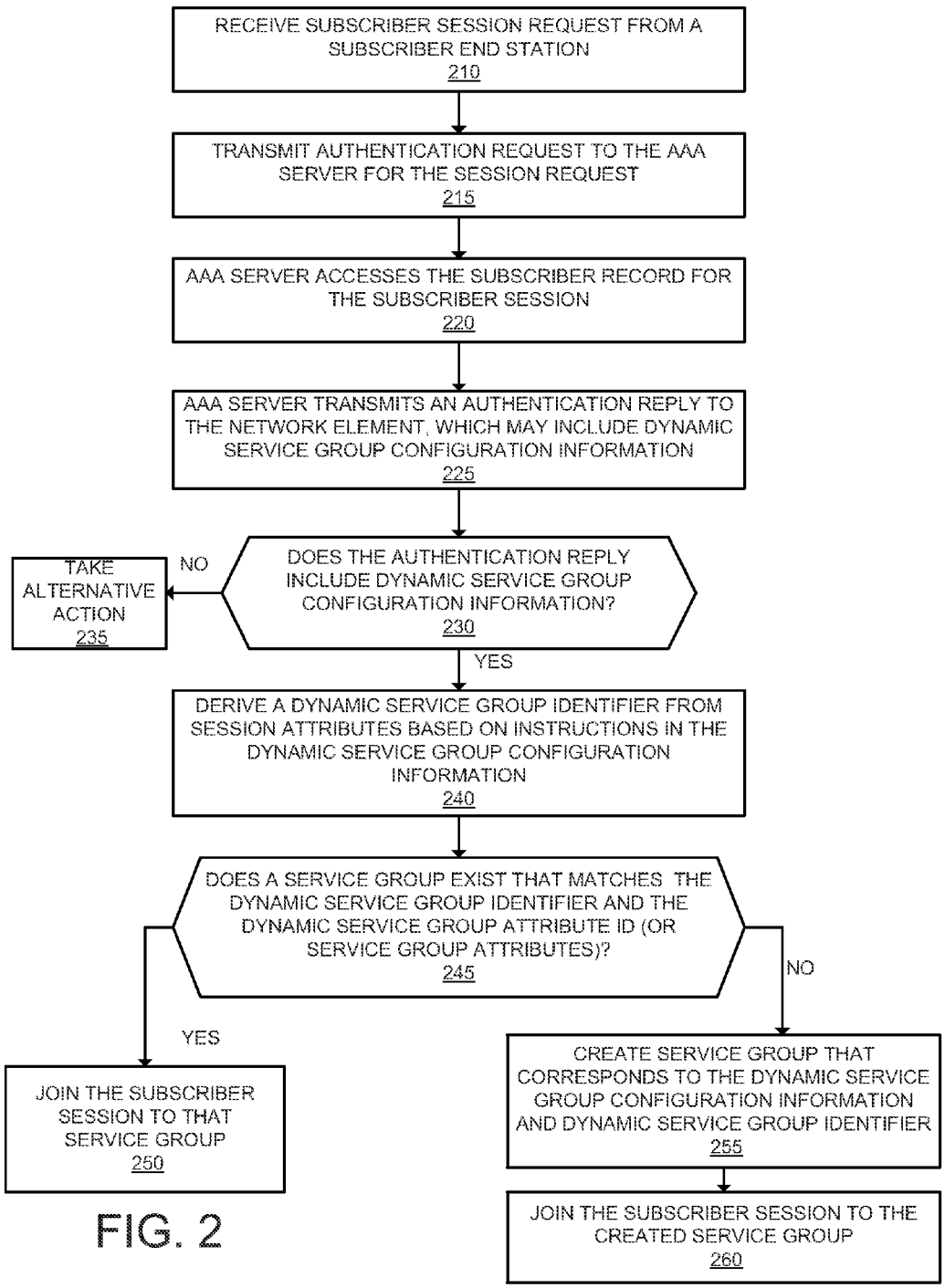
FIG. 2 is a flow diagram illustrating exemplary operations for dynamically provisioning service groups and dynamically assigning members to the service groups according to one embodiment of the invention.

FIG. 2 is a flow diagram illustrating exemplary operations for dynamically provisioning service groups and dynamically assigning members to the service groups according to one embodiment of the invention. FIG. 2 will be described with reference to the exemplary embodiment of FIG. 1. However, it should be understood that the operations of FIG. 2 can be performed by embodiments of the invention other than those discussed with reference to FIG. 1, and the embodiments discussed with reference to FIG. 1 can perform operations different than those discussed with reference to FIG. 2.

At block 210, the network element 120 receives a subscriber session request from a subscriber end station. The request includes subscriber session attributes. Flow moves from block 210 to block 215, where the network element 120 transmits an authentication request to the AAA server 150 for the subscriber session (e.g., based on an identifier associated with the subscriber session request (e.g., username and/or password, MAC address, unique key, etc.)). The authentication request may be an authentication/access-request message according to RFC 2138. Control moves from block 215 to block 220.

At block 220, the AAA server 150 accesses the appropriate subscriber record for the subscriber session. The subscriber record may be accessed based on one or more identifiers of the subscriber or subscriber end stations (e.g., username and password, MAC address, etc.). The subscriber record may include dynamic service group configuration information that the network element 120 will use to derive a dynamic service group identifier and when dynamically creating a service group for the subscriber session and its membership or dynamically assigning the subscriber session to an existing service group. In some embodiments, the subscriber record also includes a set of one or more service group attributes that will be applied to the subscriber session. Control moves from block 220 to block 225.

At block 225, the AAA server 150 transmits an authorization reply with the information from the subscriber record to the network element 120. The authorization reply will include dynamic service group configuration information from the subscriber record if it exists. The dynamic service group configuration information may be included as part of a AAA authentication/access-accept message according to RFC 2138 with a VSA that includes the dynamic service group configuration. Control moves from block 225 to block 230.

At block 230, the network element 120 determines whether the authentication reply includes dynamic service group configuration information. For example, the control module(s) 125 parse the authentication reply to determine if the VSA for dynamic service groups is included. If the authentication reply includes dynamic service group configuration information, then flow moves to block 240, otherwise flow moves to block 235 where alternative action is taken (e.g., the subscriber session is processed without being assigned to a service group).

At block 240, the network element 120 derives the dynamic service group identifier from the session attributes based on the instructions included in the dynamic service group configuration information (e.g., in the dynamic service group identifier derivation instructions portion of the dynamic service group configuration information). Flow moves from block 240 to block 245, where the network element 120 determines whether a service group exists that matches the dynamic service group identifier and the attribute template identifier (or the service group attributes depending on the embodiment) from the dynamic service group configuration information. If such a service group exists, then flow moves to block 250 where the network element 120 joins the subscriber session to that service group. If such a service group does not exist, then flow moves to block 255 where the network element 120 dynamically creates a service group that corresponds with the dynamic service group identifier and the service group attributes identified or included in the dynamic service group configuration information. Flow then moves to block 260 where the network element 120 dynamically joins the subscriber session to the created service group.

Figure 6:
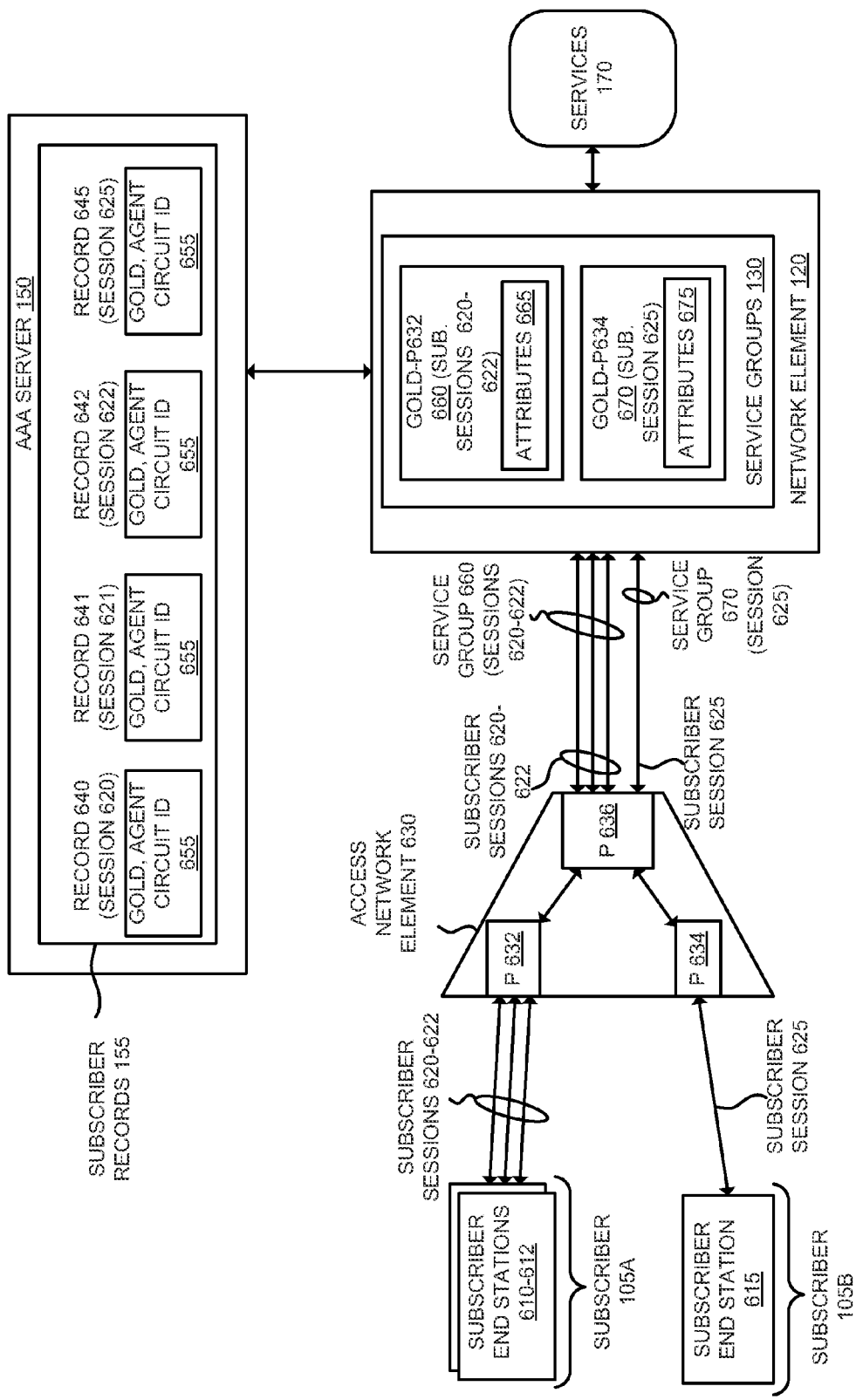
FIG. 6 illustrates an exemplary network where subscriber sessions are dynamically provisioned in a dynamic service group per subscriber according to one embodiment.

As previously described, a single subscriber may have multiple different sessions (e.g., Internet, Voice, IPTV, etc.). These multiple sessions may be members of the same service group or may be members of different service groups. As illustrated in FIG. 6, the subscriber 105A has multiple subscriber end stations 610 having the subscriber sessions 620, and the subscriber 105B has the single subscriber end station 615 having the subscriber session 625. Thus, for example, the subscriber 105A is subscribed to multiple services while the subscriber 105B is subscribed to a single service. The subscriber sessions 620 and 625 are coupled to the network element 120 through the access network element 630 (e.g., a DSLAM, a CMTS, etc.). Specifically, the subscriber sessions 620 and 625 are received at the subscriber facing ports 632 and 634 of the access network element 630 respectively. The access network element 630 multiplexes the connections and is connected to the network element 120 through the network facing port 636.

As illustrated in FIG. 6, the subscriber records 155 include subscriber records 640-642 for the subscriber sessions 620-622 respectively (of the subscriber 105A) and a subscriber record 645 for the subscriber session 625 of the subscriber 105B. Each of the subscriber records 640-642 includes the same dynamic service group configuration information 650 (gold, agent-circuit-id). In addition, the subscriber record 645 includes the same dynamic service group configuration information 650 (gold, agent-circuit-id). It should be understood that even though the records 640-642 and 645 have the same dynamic service group configuration information, the sessions 620-622 (corresponding to the records 640-642) will be grouped in a different service group than the session 625 (corresponding to the record 645) because they have different agent-circuit-id values. In this example, the agent-circuit-id identifies the subscriber facing port of the access network element 630. Thus the value of the agent-circuit-id associated with the subscriber sessions 620-622 is the port 632 and the value for the agent-circuit-id associated with the subscriber session 625 is the port 634. Since the subscriber sessions 620 and 625 are associated with different dynamic service group identifiers, they will be members of different service groups even though they may share the same policies. That is, they may each have the same bandwidth rate limit (as identified by the gold service), but they will not be joined together (thus the bandwidth used from the subscriber sessions 620-622 will not affect the bandwidth rate limit of the subscriber session 625, etc.). Thus, the service groups 130 include the Gold-P632 service group 660, which the subscriber sessions 620-622 are members, and the Gold-P634 service group 670, which the subscriber session 625 is a member. The Gold-P632 service group 660 includes the set of attributes 665 and the Gold-P634 service group 670 includes the set of attributes 675. The set of attributes 665 and 675 may be the same or may be different.

While FIG. 6 illustrates multiple subscriber sessions of a single subscriber being grouped into the same service group, embodiments of the invention are not so limited. That is, multiple subscriber sessions of a single subscriber may be grouped into two or more service groups (e.g., each subscriber session may be grouped into a separate service group if desired).

Figure 7:
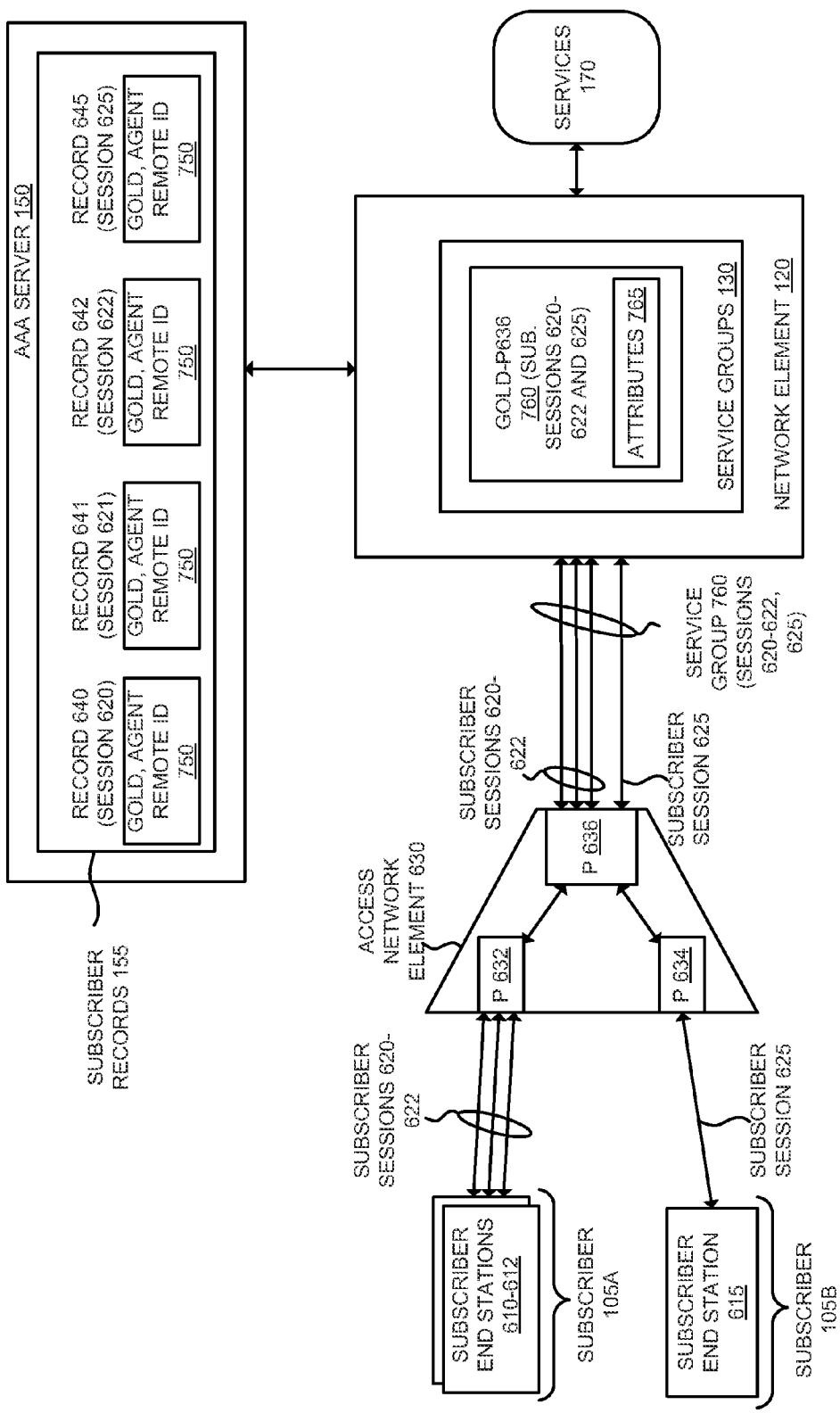
FIG. 7 illustrates an exemplary network where subscriber sessions of multiple subscribers are dynamically provisioned in a single dynamic service group according to one embodiment.

Subscriber sessions belonging to multiple subscribers may be grouped in a single dynamic service group in some embodiments. FIG. 7 illustrates the same network as in FIG. 6; however subscriber sessions from multiple subscribers are dynamically provisioned into a single dynamic service group. As illustrated in FIG. 7, the subscriber records 155 include records 640-642 for the subscriber sessions 620-622 respectively (of the subscriber 105A) and a record 645 for the subscriber session 625 of the subscriber 105B. Each of the subscriber records 640-642 include the same dynamic service group configuration information 750 (gold, agent-remote-id). In addition, the subscriber record 645 includes the same dynamic service group configuration information 750 (gold, agent-remote-id). Thus as compared with FIG. 6, the dynamic group configuration identifiers used in the example of FIG. 7 are agent-remote-ids instead of agent-circuit-ids. In this example, the agent-remote-id identifies the network facing port 636 of the access network element 630. Thus the subscriber sessions 620-622 of the subscriber 105A and the subscriber session 625 of the subscriber 105B are both associated with the same agent-remote-id. Since the subscriber records 640-642 and 645 also indicate the same service group attributes (e.g., Gold service), the subscriber sessions 620-622 and 625 will be members of the same service group. Thus, the service groups 130 include the service group Gold-P636 760, which includes the subscriber sessions 620-622 and 625 as members. The service group Gold-P636 includes the set of service group attributes 765.

Figure 8:
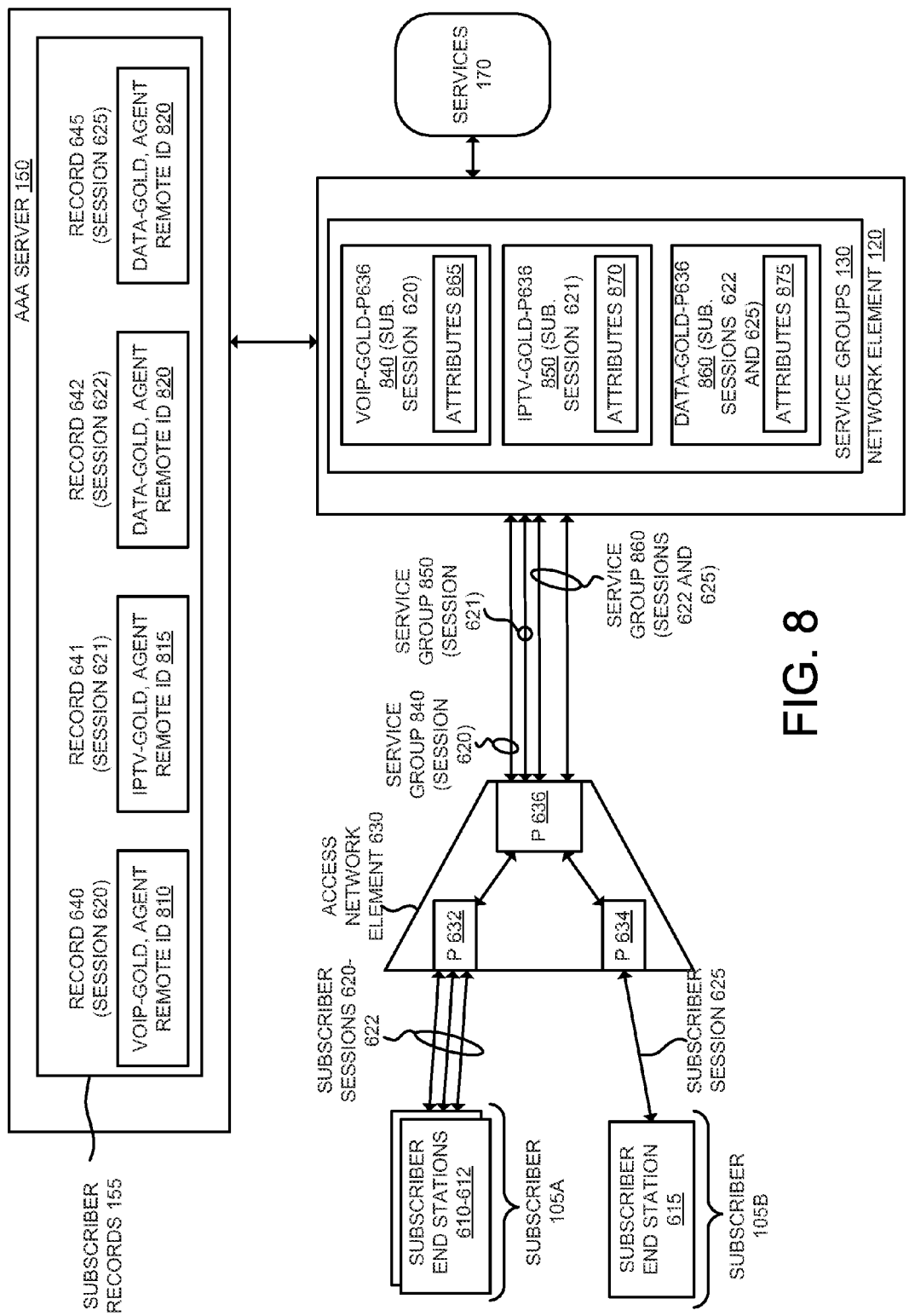
FIG. 8 illustrates an exemplary network where subscriber sessions from multiple subscribers of the same service type are dynamically provisioned in a dynamic service group.

Subscriber sessions from multiple subscribers of the same service type may be grouped in a single dynamic service group in some embodiments. FIG. 8 illustrates the same network as in FIG. 6; however subscriber sessions of the same service type from multiple subscribers are dynamically provisioned into a single dynamic service group. As illustrated in FIG. 8, the subscriber records 155 include records 640-642 for the subscriber sessions 620-622 respectively (of the subscriber 105A) and a record 645 or the subscriber session 625 of the subscriber 105B. For this example, the subscriber sessions 622 and 625 are for the same service (data (e.g., Internet)), which is different than the services for the subscriber sessions 620-621 (voice (VoIP) and IPTV respectively). The subscriber record 640 for the subscriber session 620 includes the dynamic service group configuration information 810 (VoIP-gold, agent remote id). The subscriber record 641 for the subscriber session 621 includes the dynamic service group configuration information 815 (IPTV-gold, agent remote id). The subscriber records 642 and 645, for the subscriber sessions 622 and 625, each include the same dynamic service group configuration information 820 (data-gold, agent-remote-id). In this example, the agent-remote-id for the subscriber sessions 620-622 and 625 identifies the network facing port 636. Although the subscriber sessions 620-622 of the subscriber 105A are associated with the same agent-remote-id, they do not share the same dynamic service group configuration information (the service names are different). As a result, they will be in different service groups. Thus, the subscriber session 620 will be a member of the service group VoIP-Gold-P636 840 and the subscriber session 621 will be a member of the service group IPTV-Gold-P636 850. The service group 840 is associated with the service group attributes 865 and the service group 850 is associated with the service group attributes 870. However, it should be understood that the attributes of the service groups 840 and 850 may be the same.

Since the subscriber sessions 622 and 625 of the subscribers 105A and 105B respectively are associated with the same agent-remote-id and are associated with the same dynamic service group configuration information 820, they will be members of the same service group. Thus the service group Data-Gold-P636 860 is created and the subscriber sessions 622 and 625 are members. It should be understood that the subscriber sessions 620-621 are not members of the service group 860 (even though they have the same remote-circuit-id as the subscriber sessions 622 and 625) because their corresponding subscriber records (640 and 641) do not share the same dynamic service group configuration information.

In some embodiments, the network element 120 includes a command line interface (CLI) or other interface (e.g., GUI, telnet, etc.) for network administrators (or other operators) to configure dynamic service group functionality for subscriber sessions. With reference to FIGS. 3A-3B, the network administrator configures the service group attribute template identifier portion 310 and the dynamic service group identifier derivation instructions portion 315.

In some embodiments, some of the service groups 130, including dynamically created service groups, can be homed or unhomed. As used herein, a homed dynamic service group supports all configuration parameters and bindings (e.g., scheduling parameters), including those related to Traffic Management (TM) and priority weighted fair queuing (PWFQ), while an unhomed dynamic service group only supports metering and policing bindings (thus does not include support for scheduling configuration parameters or functionality). An unhomed dynamic service group may include members that span physical ports, whereas a homed dynamic service group is limited to members from a particular port (or slot) or link-group. In one embodiment, the dynamic service group templates 140 indicate whether a service group dynamically created will be homed or unhomed (e.g., if the template is homed then the dynamic service group will be homed).

Dynamically creating a service group and dynamically assigning service group members based on a session attribute allows for greater flexibility in creating service groups. For example, it allows for multiple subscribers with the same service to be grouped in a single service group. As another example, dynamically creating service groups and their membership allows for a single subscriber with different services to be grouped in a single service group for common rate enforcement. Bandwidth by any one of those services may be used for the benefit of the other services. Common rate enforcement provided by dynamic service groups allows the maximum bandwidth total to be dynamically and flexibly shared among the member sessions or services. In addition, the service group can serve as a convenient administrative entity which can be used by a network administrator (or an automated back-end system) to adjust the level of service available for a particular service on the network (e.g., to limit the overall bandwidth used by IPTV traffic on a certain segment of the access network) and/or adjust the level of service available to a particular subscriber (e.g., if that subscriber has purchased a temporary bandwidth boost).

While embodiments of the invention have been discussed in reference to a DHCP/DSL access network, embodiments are not so limited. For example, the mechanisms described herein can be applied to other access networks (e.g., cable, FTTx (Fiber to the x), WiFi, WiMAX (Worldwide Interoperability for Microwave Access), LTE (Long Term Evolution), etc.). The dynamic service groups can also be based on incoming pseusdo wires or VLAN identifiers (e.g., the dynamic service group identifier may be based on VLAN identifier ranges or other criteria). In the case of a metro wholesale solution, the mechanisms described herein can be used to dynamically group a set of attachment circuits to form a service group for collective rate enforcement, etc.

While embodiments of the invention have been discussed in reference to a AAA server, embodiments are not so limited. For example, in some embodiments network administrators or other operators of the network element 120 can define a rule that all circuits established for a particular pseudowire or VLAN identifier value(s) should be dynamically grouped into service groups with certain attributes.

The techniques shown in the figures can be implemented using code and data stored and executed on one or more electronic devices (e.g., an end station, a network element, etc.). Such electronic devices store and communicate (internally and/or with other electronic devices over a network) code and data using machine-readable media, such as machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for dynamically creating service groups on a network element through use of an authentication, authorization, and accounting (AAA) server, the method comprising the steps of:

receiving a first request for a first subscriber session from a first subscriber end station of a first subscriber, wherein the first subscriber session represents a distinguishable flow of packets being communicated between the first subscriber end station and the network element;

transmitting an authentication request to the AAA server for the first subscriber session;

receiving an authentication reply from the AAA server, the authentication reply including dynamic service group configuration information that indicates that the first subscriber session should be part of a service group and includes service group attribute information and instructions to derive a dynamic service group identifier;

deriving a dynamic service group identifier from subscriber session attributes associated with the first subscriber session according to the instructions in the dynamic service group configuration information; and responsive to determining that a service group matching the service group attribute information and the dynamic service group identifier does not exist, performing the following steps:

dynamically creating a service group according to the service group attribute information and the dynamic service group identifier, wherein the dynamically created service group is associated with a set of one or more service group attributes corresponding to the service group attribute information, and dynamically joining the first subscriber session to the dynamically created circuit group such that the set of service group attributes are applied to the first subscriber session, whereby manual creation of the service group and manual joining of the subscriber session to the service group are avoided.

2. The method of claim 1, further comprising the steps of:

receiving a second request for a second subscriber session from a second subscriber end station of the first subscriber, wherein the second subscriber session represents a distinguishable flow of packets being communicated between the second subscriber end station and the network element that is different than the first subscriber session;

transmitting an authentication request to the AAA server for the second subscriber session;

receiving an authentication reply from the AAA server that includes dynamic service group configuration information that includes service group attribute information and instructions to derive a dynamic service group identifier;

deriving a dynamic service group identifier from subscriber session attributes associated with the second subscriber session according to the instructions in the dynamic service group configuration information, wherein the dynamic service group identifier associated with the second subscriber session is the same as the dynamic service group identifier associated with the first subscriber session; and responsive to determining that a service group matching the service group attribute information and the dynamic service group identifier exists, dynamically joining the second subscriber session to the service group such that the set of service group attributes associated with the service group are applied to the second subscriber session, wherein the first and second subscriber sessions are both part of the same service group, whereby the first and second subscriber sessions are subject to the same set of service group attributes and collective rate enforcement.

3. The method of claim 2, wherein the dynamic service group configuration information for the first and second subscriber sessions is provided from a first and second subscriber records for the first and second subscriber sessions respectively.

4. The method of claim 3, wherein the service group attribute information in the dynamic service group configuration information for the first and second subscriber sessions includes the same set of service group attributes.

5. The method of claim 3, wherein the service group attribute information in the dynamic service group configuration information for the first and second subscriber sessions includes a same reference to a dynamic service group template, wherein the dynamic service group template includes the set of service group attributes.

6. The method of claim 4, wherein the dynamic service group template is a manually created service group.

7. The method of claim 2, further comprising the steps of:

receiving a third request for a third subscriber session from a subscriber end station of a second subscriber, wherein the second subscriber is different than the first subscriber, wherein the third subscriber session represents a distinguishable flow of packets being communicated between the subscriber end station and the network element that is different than the first and second subscriber sessions;

transmitting an authentication request to the AAA server for the third subscriber session;

receiving an authentication reply from the AAA server that includes dynamic service group configuration information that indicates that the third subscriber session should be part of a service group and includes service group attribute information and instructions to derive a dynamic service group identifier;

deriving a dynamic service group identifier from subscriber session attributes associated with the third subscriber session according to the instructions in the dynamic service group configuration information, wherein the dynamic service group identifier associated with the third subscriber session is the same as the dynamic service group identifier associated with the first subscriber session; and responsive to determining that a service group matching the service group attribute information and the dynamic service group identifier associated with the third subscriber session exists, dynamically joining the third subscriber session to the service group such that the set of service group attributes associated with the service group are applied to the third subscriber session, wherein the first and second subscriber sessions belonging to the first subscriber and the third subscriber session belonging to the second subscriber are part of the same service group, whereby multiple subscriber sessions belonging to multiple subscribers are dynamically subject to the same set of service group attributes.

8. An apparatus to dynamically create service groups, comprising:

a network element, to be coupled to an authentication, authorization, and accounting (AAA) server, the network element comprising:

a plurality of control modules operative to, dynamically create service groups based on subscriber session attributes of subscriber sessions and dynamic service group configuration information, wherein each subscriber session represents a distinguishable flow of packets being communicated between the network element and a subscriber end station belonging to a subscriber, and wherein each dynamically created service group is associated with a set of one or more service group attributes, and dynamically join subscriber sessions to service groups based on subscriber session attributes of the subscriber sessions and dynamic service group configuration information associated with the subscriber sessions such that the set of service group attributes associated with the service group are applied to the subscriber sessions; and whereby service groups are dynamically created and subscriber sessions are dynamically joined to service groups thereby avoiding manual creation of service groups and manual joining of subscriber sessions to service groups.

9. The apparatus of claim 8, wherein the plurality of control modules are further operative to receive, for each subscriber session, the dynamic service group configuration information associated with the subscriber session from the AAA server, wherein the dynamic service group configuration information includes service group attribute information and instructions to derive a dynamic service group identifier from subscriber session attributes.

10. The apparatus of claim 9, wherein the plurality of control modules are further operative to, for each subscriber session, derive a dynamic service group identifier from the subscriber session attributes of the subscriber session according to the instructions in the dynamic service group configuration information.

11. The apparatus of claim 10, wherein the plurality of control modules are further operative to determine, for each subscriber session, whether a service group that matches the service group attribute information and the dynamic service group identifier associated with the subscriber session exists, wherein the plurality of control modules are operative to dynamically create and join the subscriber session to a service group if the service group does not exist and are operative to dynamically join the subscriber session to a service group if the service group exists.

12. The apparatus of claim 10, wherein at least one of the dynamic service group identifiers is shared among a plurality of subscriber sessions belonging to the same subscriber, whereby the plurality of subscriber sessions are subject to the same set of service group attributes and collective rate enforcement.

13. The apparatus of claim 10, wherein at least one dynamic service group identifier is shared among a plurality of subscriber sessions belonging to different subscribers, whereby the plurality of subscriber sessions belonging to different subscribers are subject to the same set of service group attributes and collective rate enforcement.

14. A system for dynamically creating service groups, comprising:

an authentication, authorization, and accounting (AAA) server that stores a plurality of subscriber records that each include dynamic service group configuration information; and a set of one or more network elements coupled with the AAA server, wherein each network element includes a plurality of control modules that, receives, for each of a plurality of subscriber sessions being established with the network element, dynamic service group configuration information associated with the subscriber session from the AAA server that includes criteria for determining whether to create and join the subscriber session to a service group or join the subscriber session to an existing service group, derives, for each of the plurality of subscriber sessions, a dynamic service group identifier from instructions in the corresponding dynamic service group configuration information, dynamically creates and joins, for each of the plurality of subscriber sessions, the subscriber session to a service group based on the dynamic service group identifier and the dynamic service group configuration information associated with the subscriber session if a matching service group does not exist, wherein each dynamically created service group is associated with a set of one or more service group attributes, and dynamically joins, for each of the plurality of subscriber sessions, the subscriber session to a service group based on the dynamic service group identifier and the dynamic service group configuration information associated with the subscriber session if a matching service group already exists such that the set of service group attributes associated with the service group are applied to the subscriber session;

whereby service groups are dynamically created and subscriber sessions are dynamically joined to service groups thereby avoiding manual creation of service groups and manual joining of subscriber sessions to service groups.

15. The system of claim 14, wherein at least one of the dynamic service group identifiers is shared among a plurality of subscriber sessions belonging to the same subscriber, whereby the plurality of subscriber sessions are subject to the same set of service group attributes and collective rate enforcement.

16. The system of claim 14, wherein at least one dynamic service group identifier is shared among a plurality of subscriber sessions belonging to different subscribers, whereby the plurality of subscriber sessions belonging to different subscribers are subject to the same set of service group attributes and collective rate enforcement.

17. The system of claim 14, wherein the dynamic service configuration information of each subscriber record includes service group attribute information.

18. The system of claim 17, wherein the plurality of control modules further determines, for each subscriber session, whether a service group that matches the service group attribute information and the dynamic service group identifier associated with the subscriber session exists, wherein the plurality of control modules are operative to dynamically create a service group if the service group does not exist and are operative to dynamically join the subscriber session to a service group if the service group exists.

19. The system of claim 17, wherein the service group attribute information of at least one of the subscriber records includes a set of one or more service group attributes.

20. The system of claim 17, wherein the service group attribute information of at least one of the subscriber records includes a reference to a dynamic service group template on the network element that includes a set of one or more service group attributes.

* * * * *

UNITED STATES PATENT AND TRADEMARK OFFICE
CERTIFICATE OF CORRECTION

| | |
|---|---|
| PATENT NO. | : 8,332,525 B2 |
| APPLICATION NO. | : 12/701418 |
| DATED | : December 11, 2012 |
| INVENTOR(S) | : Lynch et al. |

Page 1 of 1

It is certified that error appears in the above-identified patent and that said Letters Patent is hereby corrected as shown below:

In Column 6, Line 28, delete "DSLAMs" and insert -- DSLAM --, therefor.

In Column 6, Line 48, delete "TACAS+" and insert -- TACACS+ --, therefor.

In Column 10, Line 15, delete "level1" and insert -- level 1 --, therefor.

In Column 14, Line 46, delete "pseusdo" and insert -- pseudo --, therefor.

Signed and Sealed this
Ninth Day of April, 2013

Teresa Stanek Rea
*Acting Director of the United States Patent and Trademark Office*